United States Patent [19]
Bennett

[11] Patent Number: 4,911,124
[45] Date of Patent: Mar. 27, 1990

[54] ENGINES FOR USE WITH GASEOUS FUELS

[75] Inventor: John R. M. Bennett, Melbourne, Australia

[73] Assignee: Bennett Automotive Technology Pty., Ltd., Melbourne, Australia

[21] Appl. No.: 171,002

[22] PCT Filed: May 21, 1987

[86] PCT No.: PCT/AU87/00143
§ 371 Date: Jan. 19, 1988
§ 102(e) Date: Jan. 19, 1988

[87] PCT Pub. No.: WO87/07323
PCT Pub. Date: Dec. 3, 1987

[30] Foreign Application Priority Data
May 21, 1986 [AU] Australia .............................. PH06014

[51] Int. Cl.$^4$ .............................................. F02D 13/04
[52] U.S. Cl. ...................................... 123/321; 123/345; 123/347; 123/90.16; 123/90.4; 123/90.61; 60/323
[58] Field of Search .................... 123/321, 322, 90.16, 123/90.17, 90.18, 90.15, 345, 347, 90.4, 90.61; 60/323

[56] References Cited

U.S. PATENT DOCUMENTS

| | | | |
|---|---|---|---|
| 2,163,015 | 6/1939 | Wagner | 123/347 |
| 2,694,583 | 11/1954 | Zitza et al. | 60/323 |
| 2,997,991 | 8/1961 | Roan | 123/90.16 |
| 3,641,988 | 2/1972 | Torazza et al. | 123/90.16 |
| 4,187,810 | 2/1980 | Buehner | 123/90.16 |
| 4,205,634 | 6/1980 | Tourtelot, Jr. | 123/90.16 |
| 4,378,765 | 4/1983 | Abermeth et al. | 123/321 |

FOREIGN PATENT DOCUMENTS

| | | | |
|---|---|---|---|
| 60-228717 | 11/1985 | Japan | 123/90.16 |
| 276814 | 9/1927 | United Kingdom | 123/321 |

Primary Examiner—Andrew M. Dolinar
Attorney, Agent, or Firm—Dorsey & Whitney

[57] ABSTRACT

An internal combustion engine designed to use gas as fuel. Exhaust valve (2) operation is effected via: (i) a push rod of two parts, the respective ends of which are pivoted to an intermediate connector sliding in a bore in the cylinder head and (ii) two rocker arms (11 and 16). Fulcrum point (18) of rocker (16) may be adjusted to reduce exhaust valve lift during part throttle operation or alternatively exhaust braking during overrun conditions may be achieved by cracking open valve (2) on the compression stroke: this is effected by inward movement of wedge (21) or by a cam raising the end of rocker (16). Modifications of exhaust manifold, rocker shaft mounting, etc are also described.

17 Claims, 8 Drawing Sheets

ENGINES FOR USE WITH GASEOUS FUELS

The invention concerns means by which piston internal combustion engines, in particular those made for diesel fuel operation, may be converted to operate upon gaseous fuels.

Gaseous fuels have been used in the piston internal combustion engine in a minor way from the earliest days of its development. Until the Oil Shock of 1973, liquid fuels were, except in times of war, in ample supply at a relatively low price. Where gaseous fuels were employed, they were either a readily-available by-product of an industrial process such as sewer gas, or an alternative fuel available in a remote location such as producer gas used in mining operations.

Considerable experimentation has been undertaken into the use of gaseous fuels in the piston internal combustion engine and their use is well-known in the art. Generally speaking, however, the lower cost of gaseous fuels has not proved sufficiently attractive to enable them to supplant the more conveniently-handled and stored liquid fuels. As a result of the substantial increase in the price of petroleum products since 1973, this has now changed.

The price increase has stimulated considerable experimentation into the use of alternative fuels. Those most freely available for automotive use, and which have attracted considerable interest from the road transport industry, are natural gas and the group of fuels known generally as liquefied petroleum gas. The principal constituent of natural gas is methane and the most suitable for automotive use of the liquefied petroleum gas group is propane.

Both gasoline and diesel-powered engines are currently being converted to operate on gaseous fuels. However, it is widely accepted that, because of the lower calorific value of the gaseous fuel, the converted engine will suffer a decrement in power output. The principal cause of this power decrement is the fact that the gaseous fuel constitutes some ten percent by volume of the total charge inducted into the engine. In contrast, the atomised fuel droplets carried in the inducted airstream of a conventionally-carburetted gasoline-powered engine constitute, by volume, only a very small percentage of the total charge volume. The displacement of charge air by the gaseous fuel reduces the amount of oxygen available for combustion and thus, by reducing the amount of fuel which can be burned, reduces the power output of the engine. The provision of a so-called free-flow exhaust system may compensate for the power loss in a minor way by improving volumetric efficiency.

Diesel-powered engines are currently being converted to gaseous fuel operation in two ways. In the first method, the diesel operating principle is retained in an engine, gaseous fuel being fed into the induction system at an increasing rate as an increase in engine power is required. Diesel fuel flow is held to a minimum of approximately fifteen percent of normal, to ensure adequate injector cooling. Gaseous fuel flow is controlled simply by valves mechanically linked to the throttle, or by a more complex micro processor-controlled system. The basic shortcoming of this supplementary fuel system is the fact that the complicated, expensive and fuel quality-sensitive diesel fuel system must be retained and further complicated by the requirement for an additional fuel storage, supply and metering system. Although this arrangement fails to realise the energy potential of the fuel, fuel cost savings have been sufficient to make conversion attractive.

A more effective conversion of diesel-powered engines is achieved by the complete replacement of the diesel fuel system with a gaseous fuel system and the provision of a spark ignition system. In some cases, the camshaft is modified or replaced and the compression ratio of the engine is altered to suit the octane rating of the new fuel.

Although both of the diesel engine conversion methods outlined have been employed in automotive engines, they have been most successfully applied to engines employed in stationary, sustained-load type operations such as water pumping, well-head natural gas pumping and power generation. This is because of difficulties in creating converted engines with torque characteristics which will accommodate the rapid changes in R.P.M. and load demanded of engines in automotive applications. In most cases, converted engines also suffer from reduced power output as a result of the previously-described displacement of charge air by the gaseous fuel. In some cases, this effect is mitigated by the employment of turbo-charging. Engines adapted to gaseous fuel operation by an original equipment manufacturer are usually priced at a considerable premium over the unconverted engines.

Notwithstanding the power losses suffered by converted engines, the fuel cost savings achieved have been sufficiently attractive to create a market for converted engines or the means by which they may be converted.

The present invention aims to provide both features of an original engine design, and means for converting an existing engine to incorporate said features, whereby the engine will operate with improved flexibility and higher fuel efficiency on gaseous fuels. Preferred objectives include the reduction of engine noise and exhaust emissions and to provide arrangements where engine maintenance in both reduced and easier to achieve.

According to a first aspect of the present invention there is provided an arrangement in a reciprocating internal combustion engine having a cylinder block with a plurality of cylinders located therein, each having piston and connecting rod means reciprocable within a said cylinder to drive a crank shaft, said engine further including one or more cylinder heads with a plurality of combustion chamber zones each of which is adapted to register with one of said cylinders and with each of the said combustion chamber zones having one or more inlet valve means controlling flow of fuel/air charge into the combustion chamber zones and an exhaust valve means controlling flow of exhaust gases therefrom, and inlet and exhaust valve actuating means embodying an improvement comprising means for reducing opening of the exhaust valve means during part throttle operation of the engine.

In accordance with the objective of providing means for converting an existing engine to gaseous fuel operation, the present invention also proposes the provision of a cylinder head arrangement for a reciprocating internal combustion engine including a plurality of combustion chamber zones adapted to register with respective cylinders of the internal combustion engine, each of said combustion chamber zones having associated therewith one or more inlet valve means and exhaust valve means adapted to control flow of a fuel/air charge into the combustion chamber zones and to control flow of exhaust gases therefrom, and inlet and exhaust valve actuating means embodying an improvement comprising means for reducing opening of the exhaust valve means during part throttle operation of the engine.

Conveniently the inlet and exhaust valve means are operated by rocker members rotatably supported on rocker shafts located above said combustion chambers. Preferably the rocker members are actuated by push rod members moved by a suitably located cam shaft. The rocker member operating the exhaust valve means may comprise a primary rocker member and a secondary rocker member, one end of the secondary rocker member being operably associated with the exhaust valve means and the other end being arranged to pivot relative to an adjustable fulcrum. One end of the primary rocker member is moved by a suitable push-rod member operated by a cam on the cam shaft, whilst its other end is adapted to bear upon the secondary rocker member, causing it to pivot about said adjustable fulcrum. Adjustment of the fulcrum position varies the amount of exhaust valve lift to minimise reflux of exhaust gases into the combustion chamber during operation of the engine under different load conditions.

According to another preferred aspect, means may be provided to momentarily open the exhaust valve means for each combustion chamber when the respective piston approaches top dead centre on the compression stroke during overrun operation, to achieve a compression braking effect. This might be conveniently achieved by momentarily adjusting the position of the secondary rocker member in the previously described arrangement by adjusting the height of its fulcrum.

According to the present invention the improved cylinder head arrangements may be either built into an engine design or provided as a replacement cylinder head for conversion of an existing engine to operation with gaseous fuels. In this respect the present invention also provides a novel push rod assembly means enabling a push rod means to be comprised of a number of parts where a direct in line push rod extending from the cam shaft straight to the appropriate rocker member is not possible. In accordance with this aspect the present invention comprises a push rod assembly having at least two parts separated by a sliding connector, each said push rod part having one end in pivotal engagement with said sliding connector on opposed sides thereof and the sliding connector having an outer surface adapted to slide within a bore in the engine cylinder head upon said push rod means being moved by the associated cam shaft.

According to a further aspect of the present invention there is provided an improved arrangement in a reciprocating internal combustion engine having a cylinder block with a plurality of cylinders located therein, each having a piston and connecting rod means reciprocable within a said cylinder to drive a crank shaft, said engine further including a cylinder head with a plurality of combustion chambers each of which is adapted to register with one of said cylinders, the improvement comprising intake passage means extending at acute angles to the cylinder axis through the cylinder head to said combustion chambers and exhaust passage means leading from each combustion chamber and exiting through a side wall of the cylinder head, and valve means controlling flow through said intake and exhaust passage means. Conveniently two intake passages and one exhaust passage is provided for each combustion chamber.

According to a particularly preferred aspect of the present invention there is proposed a novel form of exhaust manifold which provides both an effective and inexpensive replacement manifold in a conversion operation. According to this aspect an exhaust stub member is fixed to the cylinder head coaxial with each of the exhaust passages with intermediate exhaust pipes inserted into each stub member and leading to a common collector member which directs the exhaust gases to a common discharge pipe. The individual intermediate exhaust pipes may simply be press fitted into the exhaust stub members or may be clamped thereto.

According to a preferred arrangement of the present invention described in more detail hereinafter, a cylinder head is provided which embodies one exhaust valve controlling the flow of exhaust gases through one exhaust port and two inlet valves controlling the flow of fuel-air mixture through two inlet ports.

Said exhaust port is made short, turning through approximately sixty degrees before exiting the side of the said cylinder head casting through a threaded bore. Except where a fairing enclosing the end of the valve guide intrudes into it, the said exhaust port is preferably made more or less square in cross sectional shape.

Said inlet ports are made with a more or less square cross sectional shape and descend steeply through the said cylinder head from an inlet manifold attachment face positioned on one side of the cylinder head casting and made normal to the axes of the upper parts of the said inlet ports.

The heads of the said valves are located in part-spherical recesses in the said cylinder head casting lower deck, the more or less triangular flat surfaces between the said recesses forming squish surfaces. Carried in the lower part of the bores through which the pushrods pass are sliders retained by circlips inserted into grooves beneath them. The usual single pushrod for each rocker is replaced by two pushrods, one extending from the cam follower to the said slider and one extending from the slider to the rocker.

The said two inlet valves for each cylinder are operated by a single bifurcated inlet valve rocker carried on a separate inlet valve rocker shaft, said rocker being provided with conventional lash adjustment means. Said exhaust valve is operated by the combined action of two rockers, hereinafter referred to as primary and secondary exhaust valve rockers. The pushrod for the said exhaust valve operates the said primary exhaust valve rocker which is carried on a separate exhaust valve rocker shaft.

Fixed to the free end of the said primary exhaust valve rocker is a roller which coacts with a recess in the upper surface of the said secondary exhaust valve rocker. One end of the said secondary rocker is provided with a roller which bears upon the head of the stem of the said exhaust valve, the other being supported by a fulcrum, the position of which is slideably adjustable by means of a fulcrum adjustment rod extending out through the side wall of the said cylinder head casting.

The position of the said fulcrum, and thus the lift of the said exhaust valve is adjusted by extending inwards or retracting the said rod by means of a suitable operating mechanism.

The head of the said sliding fulcrum is provided with rollers which permit it to move freely. Lash of the said exhaust valve is adjusted by repositioning the outer stop of the said fulcrum adjustment rod. The said adjustable fulcrum is supported upon a sliding wedge member which is supported upon an inclined plane by rollers.

The position of said wedge member is slideably adjustable by means of a wedge member adjustment rod extending out through the side wall of the said cylinder head casting.

Provision is made to momentarily crack the said exhaust valve off its seat as the piston approaches top dead centre on the compression stroke to generate a compression braking effect during overrun operation. Said cracking of the said exhaust valve is achieved by momentarily extending inward the said wedge member adjustment rod at an appropriate timing. Said momentary inward extension of the said wedge member adjustment rod is achieved by means of a small ram operated by a flow of compressed air controlled by a solenoid valve, or by electro-hydraulic means.

In an alternative embodiment, said wedge member and its adjustment rod are deleted and the outer, free end of the said secondary exhaust valve rocker is momentarily raised at an appropriate timing by means of a rotating cam. Said cam is fixed to an auxiliary camshaft driven from the engine crankshaft at half crankshaft speed, or driven by a suitable electrically-operated stepper motor.

The area above each cylinder head is enclosed by a rocker box in the end walls of which are supported one end of each of the said rocker shafts. The outer end of the said inlet valve rocker shaft is supported wholly in a bore in the end wall of the said rocker box. The outer end of the said exhaust valve rocker shaft, the axis of which is coincident with the rocker box to cylinder head parting face, is supported in a bore half in said rocker box and half in said cylinder head.

Said rocker box is made with a medial web normal to the axes of the said rocker shafts, to the underside of which is bolted a rocker shaft mounting block in a bore in which is supported the inner end of the said exhaust valve rocker shaft. The said inlet valve rocker shaft is made such that its axis is coincident with the said medial web to said mounting block parting face and is captured in a bore positioned half in each. The bore in the said mounting block accommodating the end of the said exhaust valve rocker shaft is opened with a saw cut in such a way that the pressure of one of the said bolts fixing the said mounting block to the said medial web acts to clamp the end of the said exhaust valve rocker shaft in its said bore.

Another of the said bolts by which the said mounting block is fixed passes through the end of the said inlet valve rocker shaft and the bore in which it is accommodated. The top of the said rocker box is closed by a suitable cover, said cover being provided with suitable removable plugs giving access to the rocker lash adjustment means. Screwed into the said threaded bores in the side of the said cylinder head casting are exhaust stubs into which individual cylinder exhaust pipes are inserted.

The outer ends of a plurality of the said exhaust pipes are inserted into a plurality of stubs in one or more collector members which are adapted to direct the exhaust gases into main exhaust pipes or a turbo-charger casing. Said collector members are fixed to the engine structure, effectively capturing the said individual cylinder exhaust pipes.

In an alternative embodiment, complementary exhaust pipes and stubs are provided with coacting locking lugs by which said exhaust pipes are secured. Inlet manifolds comprise a plurality of long tubular runners of circular cross sectional shape, the ends of which terminate in flanges fixed to the inlet manifold mounting face on the side of the said cylinder head casting.

In the preferred embodiment, one of the said inlet manifold runners for each cylinder terminates in a separate plenum supplied with fuel-air mixture by a suitable gas fuel carburettor (mixer). Each of the said plenums is provided with a throttle valve and provision is made to operate the engine at idle and low to medium power on the fuel-air flow from one plenum only. At medium to high power, both throttle valves are opened.

In an alternative embodiment, all of the said inlet manifold runners are supplied with fuel-air mixture from one plenum supplied by one gas mixer, said flow being controlled by a single throttle valve. A conversion device is also provided which is inserted in place of the diesel fuel injector and forms a convenient spark plug housing.

A means of providing an enlarged tappet contact surface at the end of the exhaust valve is also provided.

The nature of the present invention will be more readily understood by the following description given in relation to the accompanying drawings illustrating the just described preferred arrangement. In the drawings.

Figure 1:
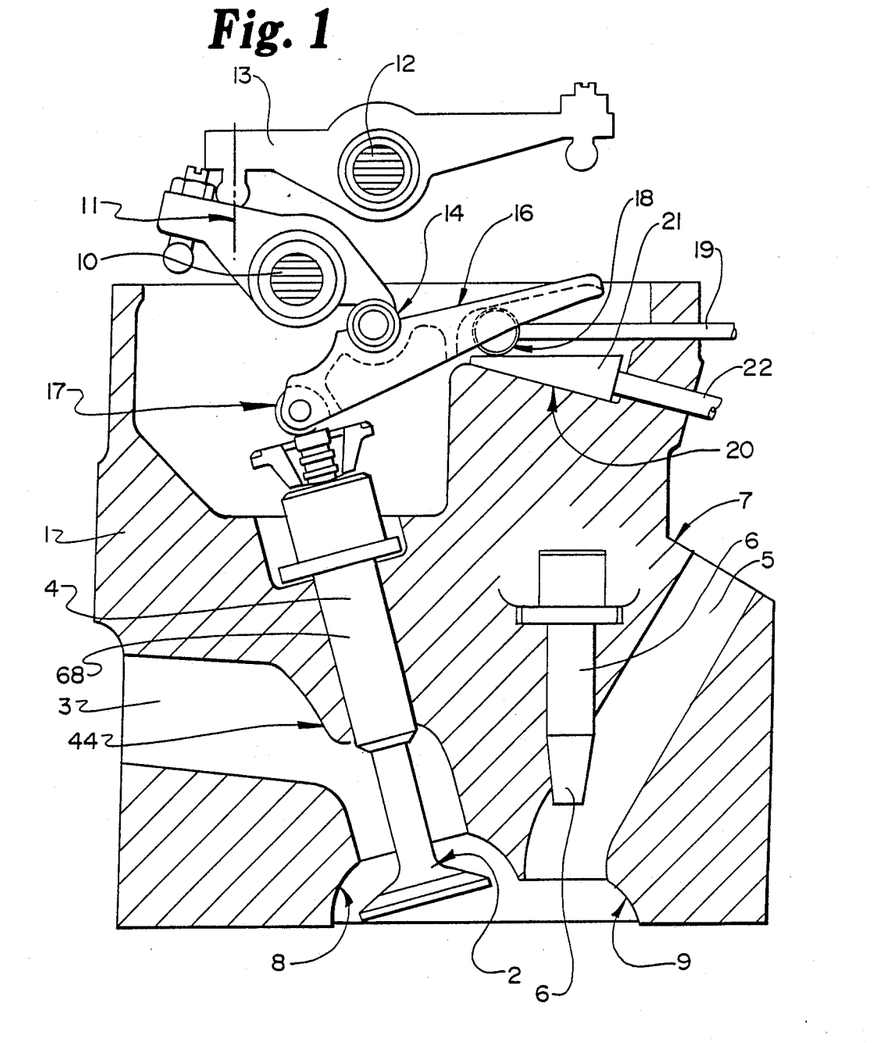
FIG. 1 is a transverse cross-sectional view of the cylinder head showing the arrangement of the exhaust valve actuating rockers.

With reference to FIG. 1, a replacement cylinder head is provided which embodies one exhaust valve 2 controlling the flow of exhaust gases through one exhaust port 3, and two inlet valves (not shown) controlling the flow of fuel-air mixture through two inlet ports 5. Said exhaust port is made short, turning through approximately sixty degrees before exiting the side of the said cylinder head casting through a threaded bore (depicted as 43 in FIG. 7).

Except where fairing 44 enclosing the end of valve guide 68 intrudes into it, the said exhaust port is made more or less square in cross-sectional shape. Said inlet ports are also made more or less square in cross-sectional shape and descend steeply through the said cylinder head from inlet manifold attachment face 7 positioned on one side of the said cylinder head casting and made normal to the axes of the upper parts of the said inlet ports.

The heads of the said valves are located in part-spherical recesses 8 and 9 in the lower face of the said cylinder head, the flat, more or less triangular areas of cylinder head face between them forming squish surfaces.

Figure 2:
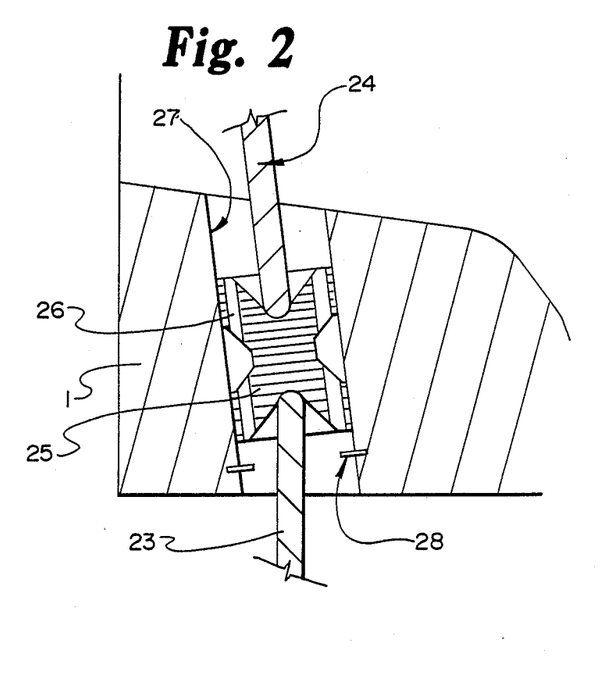
FIG. 2 is a cross-sectional view of the arrangement of the pushrod slider in the cylinder head.

With further reference to FIG. 2, carried in the lower part of bore 27 in the said cylinder head through which pushrod 24 passes is slider 25 retained by circlip 28 inserted into a groove beneath it. The usual single pushrod for each rocker is replaced by upper pushrod 24 extending from the said slider to the exhaust valve rocker and lower pushrod 23 extending from the cam follower to the said slider, said arrangement permitting adaption of original pushrod location to relocated components in the said replacement cylinder head. Bores 26 are provided in the said slider to permit draining of oil from the rocker box via the said pushrod bore.

Figure 4:
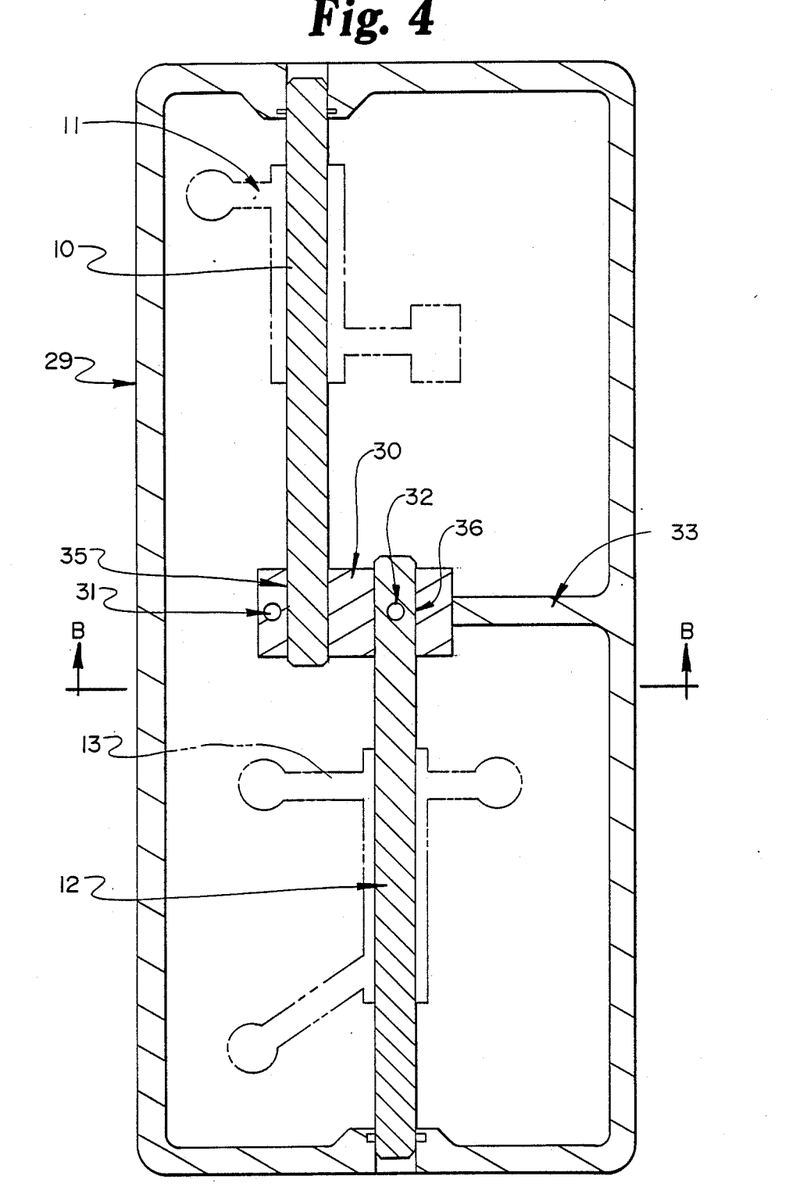
FIG. 4 is a longitudinal sectional view of the rocker box along the axis AA in FIG. 3 showing the arrangement of the rocker shafts and rockers within the rocker box.

With reference to FIG. 4 the said two inlet valves for each cylinder are operated by single bifurcated inlet valve rocker 13 carried on separate inlet valve rocker shaft 12, said rocker being provided with conventional lash adjustment means.

With reference to FIGS. 1 and 4 the said exhaust valve is operated by the combined action of two rockers, hereinafter referred to as primary exhaust valve rocker 11 and secondary exhaust valve rocker 16. Exhaust valve pushrod 24 operates the said primary exhaust valve rocker which is carried upon separate exhaust valve rocker shaft 10. Fixed to the free end of the said primary exhaust valve rocker is roller 14 which coacts with recess 15 in the upper surface of the said secondary exhaust valve rocker.

One end of the said secondary exhaust valve rocker is provided with roller 17 which bears upon the end of the stem of exhaust valve 2, the other being supported by fulcrum 18, the position of which is slideably adjustable by means of fulcrum adjustment rod 19, extending out through the side wall of the said cylinder head casting.

Said fulcrum adjustment rod is provided with a means of articulation (not shown) inside the side wall of the said cylinder head casting. The position of the said fulcrum and thus the resultant lift of the said exhaust valve is adjusted by extending inward or retracting outward the said fulcrum adjustment rod by means of a suitable operating mechanism.

The head of the said sliding fulcrum is provided with roller which permit it to move freely, said rollers bearing separately against the underside of the said secondary exhaust valve rocker and the upper surface of wedge member 21 beneath it. The said primary exhaust valve rocker is provided with conventional lash adjustment means. The said adjustable fulcrum is supported upon wedge member 21 which is supported upon inclined plane 20 by suitable rollers (not shown) permitting it to move freely.

In an alternative embodiment, said rollers are replaced by two rows of balls (not shown) carried in complementary grooves in the mating faces of the said wedge member and the said inclined plane. The position of the said wedge member is slideably adjustable by means of wedge member adjustment rod 22 extending out through the side wall of the said cylinder head casting.

Provision is made to momentarily crack the said exhaust valve off its seat as the piston approaches top dead centre on the compression stroke, to generate a compression braking effect during overrun operation. Said cracking of the said exhaust valve is achieved by momentarily extending inward the said wedge member adjustment rod at an appropriate timing. Said momentary inward extension of the said wedge member adjustment rod serves to lift the said adjustable fulcrum and thus the outer end of the said secondary exhaust valve rocker, thereby depressing the said exhaust valve.

Actuation of the said wedge member adjustment rod is achieved by means of a small ram (not shown) operated by a flow of compressed air and controlled by a solenoid valve, or by electro-hydraulic means.

In an alternative embodiment, said wedge member and its adjustment rod are deleted and the said compression braking effect is achieved by raising the outer, free end of the said secondary exhaust valve rocker momentarily at an appropriate timing by means of a rotating cam bearing upon its underside.

Figure 3:
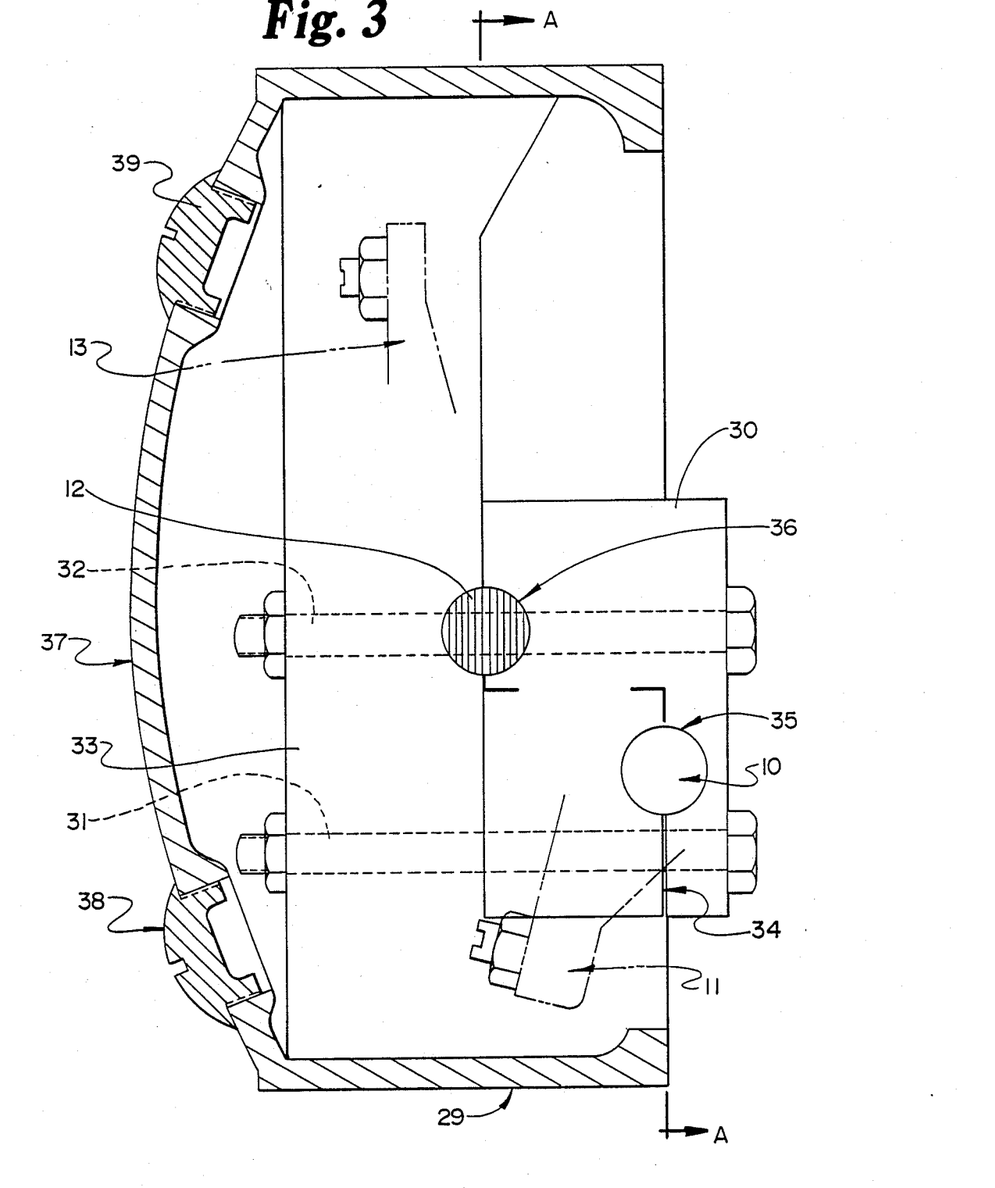
FIG. 3 is a transverse sectional view of the rocker box and lid along the axis BB in FIG. 4.

Said cam is fixed to an auxiliary camshaft driven from the engine crankshaft at half crankshaft speed, or driven by a suitable electrically-operated stepper motor. With further reference to FIGS. 3 and 4, the area above each cylinder head is enclosed by rocker box 29, in bores in the end walls of which are supported one end of each of the two said rocker shafts. The outer end of the said inlet valve rocker shaft is supported wholly in a bore in the end wall of the said rocker box.

The outer end of the said exhaust valve rocker shaft, the axis of which is coincident with the cylinder head to rocker box parting face, is supported in a bore half in the said rocker box and half in the said cylinder head. Said rocker box is made with a medial web 33 normal to the axes of the said rocker shafts, to the lower edge of which is bolted rocker shaft mounting block 30, in a bore in which is supported the inner end of the said exhaust valve rocker shaft. The said inlet valve rocker shaft is made such that its axis is coincident with the said medial web to said mounting block parting face and is captured in a bore positioned half in each. The bore in the mounting block accommodating the inner end of the said exhaust valve rocker shaft is opened with saw cut 34, bolt 31 fixing the said rocker shaft mounting block to the said rocker box medial web serving to clamp the end of the said shaft in the said bore.

Another bolt 32 by which the said rocker shaft mounting block is fixed passes through the end of the said inlet valve rocker shaft and the said bore in which it is accommodated. The top of the said rocker box is closed by a suitable cover 37 which, in the preferred embodiment, is made removable, said cover being provided with suitable removable plugs 38 and 39 giving access to the said rocker lash adjustment means.

Figure 7:
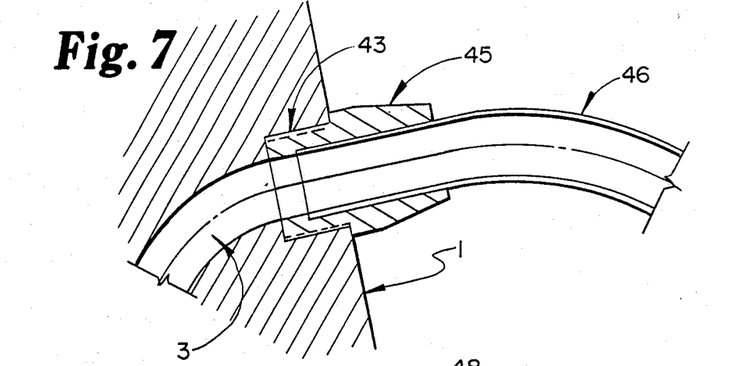
FIGS. 7, 8 and 9 show details of the arrangement of the exhaust system.
Figure 8:
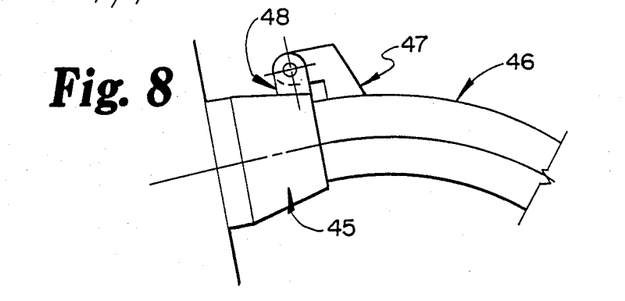
Figure 9:
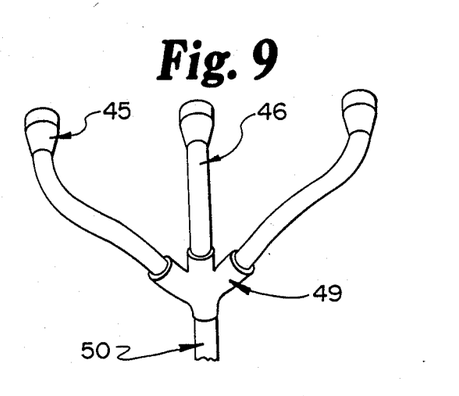

With further reference to FIGS. 7, 8 and 9, screwed into the said threaded bores in the side of the said cylinder head casting are exhaust stubs 45 into which individual cylinder exhaust pipes 46 are inserted. The outer ends of a plurality of the said individual cylinder exhaust pipes are inserted into a plurality of stubs in one or more collector members 49 which are adapted to direct the exhaust gases to exhaust pipe 50 or to the inlet casing of a turbo-charger. Said collector members are fixed to the engine structure, effectively capturing the said individual cylinder exhaust pipes.

In an alternative embodiment in which the said collector members are not positively located, complementary pairs of the said exhaust pipes and stubs are provided with coacting locking lugs 47 and 48 by means of which the said exhaust pipes may be secured.

Figure 5:
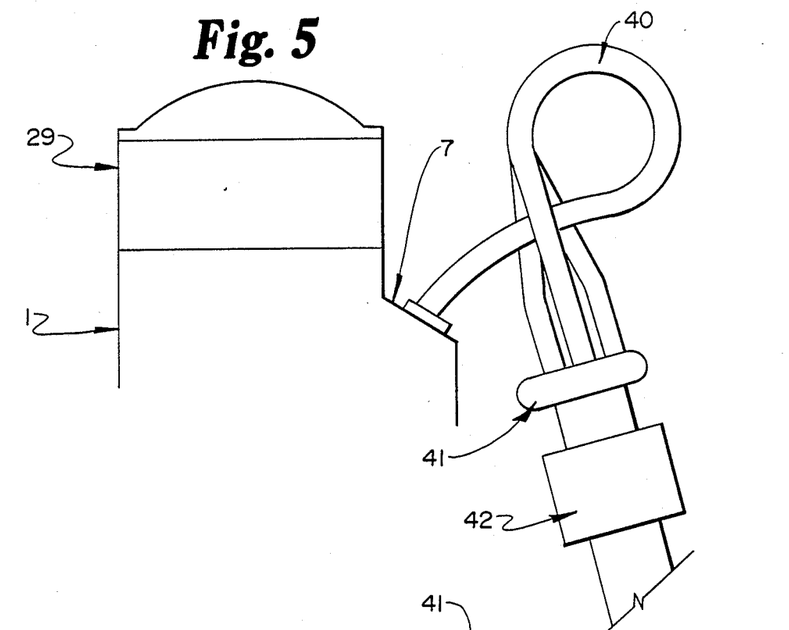
FIGS. 5 and 6 show two alternative arrangements of the inlet manifold runners.
Figure 6:
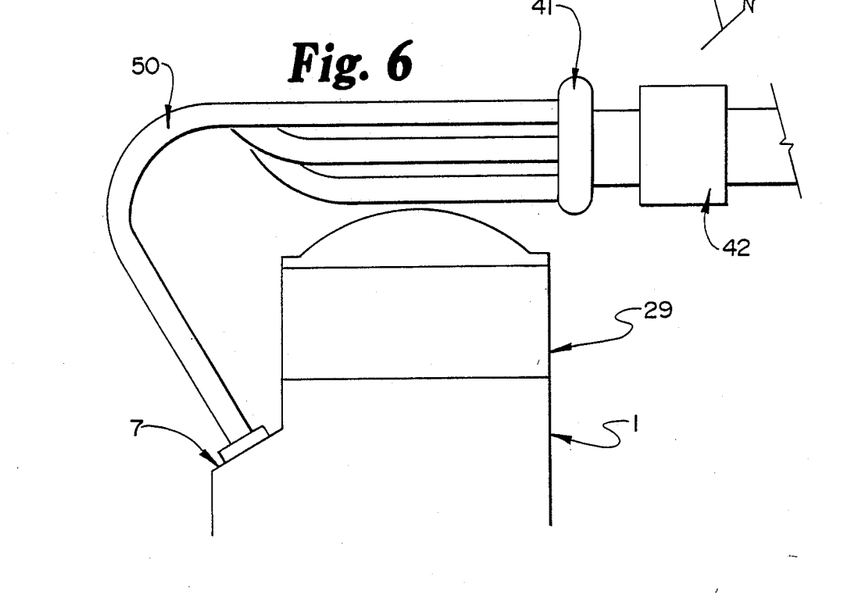

With further reference to FIGS. 5 and 6, inlet manifolds comprise a plurality of long tubular runners 40 of circular cross-sectional shape, the ends of which terminate in flanges fixed to inlet manifold mounting face 7 on the side of the said cylinder head casting. In the preferred embodiment, one of the said inlet manifold runners for each cylinder terminates in a separate plenum 41 supplied with fuel-air mixture by a suitable gas fuel mixer 42.

Each of the said plenums is provided with a throttle valve and provision is made to operate the engine at idle and low to medium power on the fuel-air flow from one plenum only. At medium to high power, both throttle valves are opened. In an alternative embodiment, all of the said inlet manifold runners are supplied with fuel-air mixture from one plenum, said flow being controlled by a single throttle valve.

In conjunction with the said cylinder head design, said inlet manifold arrangement provides excellent torque production from a low R.P.M., high power and good fuel efficiency.

Figure 10:
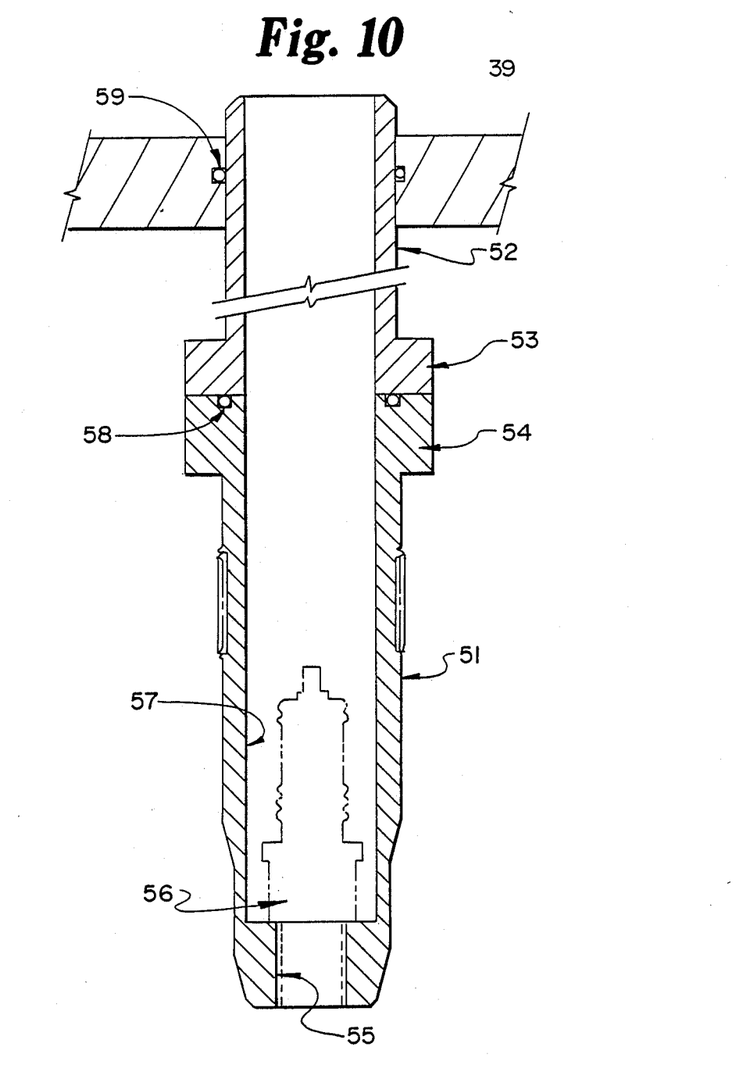
FIG. 10 shows a means of mounting a spark plug in a cylinder in a housing replacing the diesel injector.

With reference to FIG. 10, it is possible to operate some engines upon methane fuel without reducing the original diesel fuel compression ratios. Where this is possible and the performance decrement of a simple conversion is acceptable, it is possible to effect conversion from diesel fuel operation without the need to remove cylinder heads for modification to permit the installation of spark plugs.

Accordingly, spark plug adapter sleeve 51 is installed in place of the original diesel fuel injector, said sleeve being screwed or clamped into place in the normal way. The nose of the said adapter sleeve is provided with threaded bore 55, into which is screwed spark plug 56 accommodated within bore 57. The upper end of the said adapter sleeve is provided with flange 54 which abuts complementary flange 53 on extension sleeve 52, the faces of the said flanges being sealed by "O" ring 58. The upper end of the said extension sleeve is pressed or screwed into cover 37 of the said rocker box and sealed by sealing means 59.

The lengths of the two said sleeves are made such that, when the said rocker box is fixed into place, the complementary faces of flanges 53 and 54 will be firmly in contact.

Figure 11:
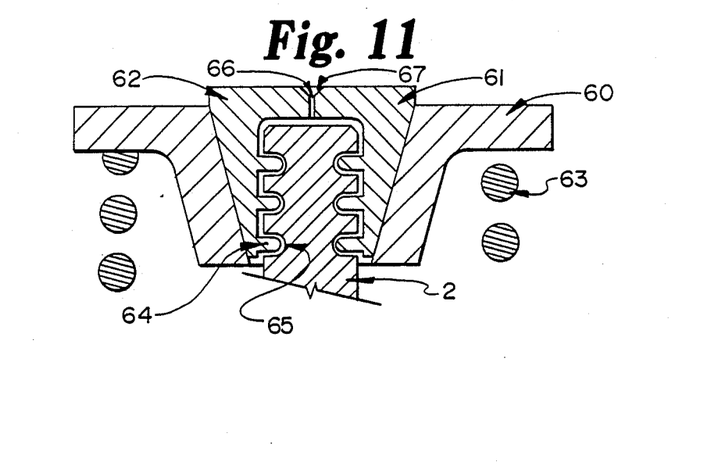
FIG. 11 in section and FIG. 12 in a plan show a valve spring retaining collar which provides a larger bearing surface for the tappet roller.
Figure 12:
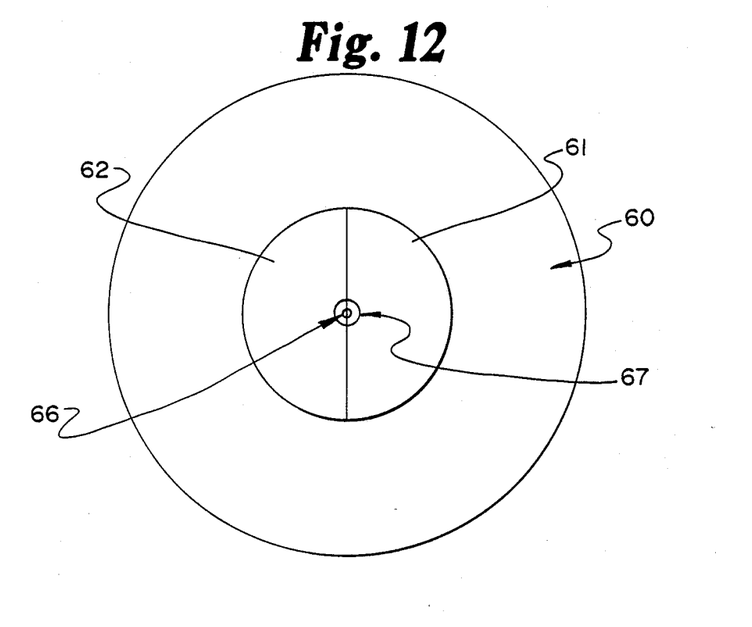

With reference to FIGS. 11 and 12, some arrangements of the said primary and secondary exhaust valve rockers are such that the radial travel of roller 17 (as depicted in FIG. 1) on secondary exhaust valve rocker during valve actuation exceeds the width of the head of the stem of the said exhaust valve.

Accordingly, valve spring cap 60 is provided which is wedgably attached to the head of valve stem 2 by two wedging collets 61 and 62. Said wedging collets are made to extend above the said valve spring cap and fully enclose the head of the stem of the said exhaust valve to form a flat wear-resistant face of greater width.

The end of the stem of the said exhaust valve is provided with circumferential grooves 65 of generally semi-circular cross-sectional shape which coact with projections 64 made on the inside faces of the said wedging collets.

Clearance is provided between the said grooves and projections such that, with the said wedging collets locked into the said valve spring cap, the said valve is permitted axial float of approximately 0.2 mm.

Passing between the upper flat mating faces of the said wedging collets is oil hole 66 which is made with a chamfered opening 67. The action of tappet roller 17 passing over the said oil hole chamfered opening causes oil to be forced into the said opening. The said oil passes down through the said clearance between the said valve stem grooves and wedging collet projections, damping the axial float of the said valve.

Where an engine is to operate on a gaseous fuel with an octane rating less than that of methane, its compression ratio must be reduced. In the preferred embodiment, this is achieved by the provision of a piston with a crown shaped as a broad shallow dish surrounded by a flat annular squish surface the width of which is approximately ten to fifteen percent of the piston crown diameter.

Preferably, the depth of the said dish in the piston crown is made such that its cubic capacity is not less than twenty five percent of that of the total combustion chamber. The said reduction in engine compression ratio is achieved, where possible, by the removal of metal from the piston crown, or by the provision of replacement pistons.

To obtain the best torque and power from a converted engine, the diesel camshaft must be modified or replaced. Preferably, the valve phasing produced by the modified or replacement camshaft will be: inlet valve opening between twenty and thirty degrees of crankshaft rotation before top dead centre and closing between sixty and seventy degrees after bottom dead centre; and exhaust valve opening between sixty and seventy degrees of crankshaft rotation before bottom dead centre and closing between twenty and thirty degrees after top dead centre.

The exact valve phasing and cam profile providing the best result for a particular converted engine type will only be determined by experimentation.

I claim:

1. An arrangement in a reciprocating internal combustion engine having a cylinder block with a plurality of cylinders located therein, each having piston and connecting rod means reciprocable within a said cylinder to drive a crank shaft, said engine further including at least one cylinder head with a plurality of combustion chamber zones each of which is adapted to register with one of said cylinders and with each of the said combustion chamber zones having at least one inlet valve means controlling flow of fuel/air charge into the combustion chamber zones and an exhaust valve means controlling flow of exhaust gases therefrom, and inlet and exhaust valve actuating means comprising means for reducing opening of the exhaust valve means during part throttle operation of the engine wherein the inlet and exhaust valve means are operated by rocker members supported on rocker shafts located above said combustion chamber zones and the rocker member operating each said exhaust valve means comprises a primary rocker member and a secondary rocker member, one end of the secondary rocker member being operably associated with the exhaust valve means and the other end being arranged to pivot relative to an adjustable fulcrum, the primary rocker member being pivoted on a said rocker shaft and rotated thereabout in timed sequence, one end of the primary rocker member engaging the secondary rocker member causing the secondary rocker member to pivot about said adjustable fulcrum, said arrangement further including means for momentarily altering the height of said adjustable fulcrum whereby said secondary rocker member acts to momentarily open the exhaust valve means when the piston associated with the combustion chamber zone approaches top dead centre on a compression stroke during overrun operation.

2. An arrangement in a reciprocating internal combustion engine having a cylinder block with a plurality of cylinders located therein, each having piston and connecting rod means reciprocable within a said cylinder to drive a crank shaft, said engine further including at least one cylinder head with a plurality of combustion chamber zones each of which is adapted to register with one of said cylinders and with each of the said combustion chamber zones having at least one inlet valve means controlling flow of fuel/air charge into the combustion chamber zones and an exhaust valve means controlling flow of exhaust gases therefrom, and inlet and exhaust valve actuating means comprising means for reducing opening of the exhaust valve means during part throttle operation of the engine wherein separate inlet and exhaust valve rocker shafts are made such that their outer ends are carried respectively in a bore in an end wall of a rocker box and in a bore halved between the cylinder head upper edge and the lower edge of the said rocker box and, at their inner ends, respectively in a bore halved between a medial web and a mounting block attached thereto and in a bore in the said mounting block.

3. A valve actuation arrangement mounted in a cylinder head for a reciprocating internal combustion engine, said cylinder head including a plurality of combustion chamber zones arranged for co-operation with cylinders of said engine, at least one charge inlet passage leading to each said combustion zone and at least one exhaust passage leading from each said combustion zone, inlet valve means controlling flow through said inlet passages and exhaust valve means controlling flow through said exhaust passages, said valve actuation arrangment being cooperable with each said exhaust valve means and comprising:

a primary rocker member pivotally mounted on a first shaft, said primary rocker member having a first arm adapted to be actuated by a push rod member to effect rocking of said primary rocker member about said first shaft, a secondary rocker member articulated with and actuated by a second arm of said primary rocker member, said secondary rocker member having a first end bearing upon a respective said exhaust valve means to be actuated by said valve actuation arrangement and a second end supported by moveable fulcrum means, first means being provided for moving said fulcrum means to vary a rocking arc of said secondary rocker member to thereby vary lifting of said exhaust valve means, and second means being provided for momentarily pivoting said secondary rocker member about said fulcrum means whereby said secondary rocker member is adapted to momentarily open the said respective exhaust valve means when the piston associated with each combustion zone approaches top dead centre on a compression stroke during overrun operation.

4. A valve actuation arrangement according to claim 3 further including adjustment means for momentarily altering the height of said fulcrum means whereby said secondary rocker member is adapted to momentarily open the respective said exhaust valve means.

5. A valve actuation arrangement according to claim 4, wherein said adjustment means comprises a movable wedge support upon which said fulcrum means is carried, said wedge support means being movably arranged to effect said momentary height variation of said fulcrum means.

6. A valve actuation arrangement according to claim 3 further including said push rod member being located with one end actuating said primary rocker member and an opposed end engaging with a sliding connector, a second push rod member being adapted to extend from said sliding connector to a cam means for timing reciprocating movement of both said push rod members, at least one of said push rod members being arranged for pivotal movement relative to said sliding connector whereby said push rod members need not be aligned.

7. A valve actuation arrangement according to claim 6, wherein said sliding connector is arranged to slide within a bore within said cylinder head, said bore opening onto a parting face adapted to engage with a cylinder block of the internal combustion engine, and retaining means being provided to prevent said sliding connector moving beyond said parting face.

8. A valve actuation arrangement according to claim 3 wherein the respective said exhaust valve means includes a valve stem having an end directed towards said first end of the secondary rocker member, said end of the valve stem including capping means having a contact surface with a surface area substantially greater than the cross-sectional area of said valve stem, said capping means being arranged to engage a contact roller carried by said first end of the secondary rocker member.

9. A valve actuation arrangement according to claim 8 wherein said capping means comprises at least two sections which together form a frusto conical outer surface generally surrounding said valve stem, said contact surface being formed by regions overlying the valve stem with outer surfaces arranged generally perpendicular to the axis of said valve stem, a valve spring retaining collar located about said capping means having an inner frusto conical surface corresponding to said frusto conical outer surface of said capping means, and radially directed intermeshing projections and openings on said valve stem and said capping means sections to retain said capping means sections in an axial direction on said valve stem when said valve spring collar is located about said capping means.

10. A valve actuation arrangement according to claim 9, wherein said intermeshing projections and openings in said valve stem and said capping means sections allow limited axial movement therebetween.

11. A valve actuation arrangement according to claim 3, wherein a removable rocker cover is mounted to said cylinder head with said first shaft being disposed with a first end engaged in recesses in a peripheral wall of said rocker member and said cylinder head at a parting face between said rocker cover and said cylinder head, a second end of said first shaft being retained in fixed relation in a mounting block connected to a medial web of said rocker cover.

12. A valve actuation arrangement according to claim 11, wherein a said inlet valve means for the internal combustion engine is operated by a third rocker member pivotally mounted on a second shaft, said third rocker member having a first arm adapted to be actuated by a push rod member to effect rocking of said third rocker member about said second shaft and a second arm adapted to engage said inlet valve means, said second shaft being mounted between the peripheral wall of said rocker cover and said medial web of said rocker cover.

13. A valve actuation arrangement in accordance with claim 3, and further including an exhaust stub member fixed to the cylinder head coaxial with said at least one exhaust passage leading from each said combustion chamber zone of the cylinder head and an exhaust manifold adapted to be connected to said exhaust stub members whereby exhaust gases are led to a common discharge pipe.

14. A valve actuation arrangement in accordance with claim 3, wherein the at least one inlet passage leading to each said combustion chamber zone is disposed at an acute angle to a longitudinal axis of the associated cylinder arranged for co-operation with the said combustion chamber zone, and the exhaust passage leading from each said combustion chamber zone passes through a side wall of the cylinder head.

15. An arrangement in accordance with claim 14, wherein two said inlet passages and one said exhaust passage are provided for each said combustion chamber zone.

16. An arrangement according to claim 15 wherein the inlet passages and the exhaust passages have a substantially square or rectangular cross-section over a substantial portion of their length.

17. An arrangement in a reciprocating internal combustion engine having a cylinder block with a plurality of cylinders located therein, each having piston and connecting rod means reciprocable within a said cylinder to drive a crank shaft, said engine further including at least one cylinder head with a plurality of combustion chamber zones each of which is adapted to register with one of said cylinders and with each of said combustion chamber zones having a least one inlet valve means controlling flow of a fuel/air charge into the combustion chamber zones and an exhaust valve means controlling flow of exhaust gases therefrom, inlet and exhaust valve actuating means including separate inlet and exhaust valve rocker shafts and means for reducing opening of the exhaust valve means during part throttle operation of the engine, a first one of said rocker shafts having an outer end carried in a bore in an end wall of a rocker box and an inner end carried in a bore halved between a medial web of said rocker box and a mounting block releasably secured to said medial web by connecting means, and a second one of said rocker shafts having an inner end carried in a bore located in said mounting block and an outer end carried in a bore halved between an upper edge of the cylinder head and a lower edge of said rocker box.

* * * * *